(12) United States Patent  (10) Patent No.: US 7,498,853 B2
Jang  (45) Date of Patent: Mar. 3, 2009

(54) SKEW-REDUCING SIGNAL LINE SUB-DRIVER CIRCUITS, METHODS AND SYSTEMS

(75) Inventor: Seong-jin Jang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 24 days.

(21) Appl. No.: 11/668,023

(22) Filed: Jan. 29, 2007

(65) Prior Publication Data
US 2008/0024331 A1  Jan. 31, 2008

(30) Foreign Application Priority Data
Jul. 29, 2006  (KR)  .................. 10-2006-0071805

(51) Int. Cl.
*H03K 3/00*  (2006.01)
(52) U.S. Cl. .................. 327/108; 327/112; 327/170
(58) Field of Classification Search .............. 327/108, 327/112, 170
See application file for complete search history.

(56) References Cited

U.S. PATENT DOCUMENTS

| | | | | |
|---|---|---|---|---|
| 5,281,865 A | * | 1/1994 | Yamashita et al. | 327/208 |
| 5,986,490 A | * | 11/1999 | Hwang et al. | 327/202 |
| 6,239,640 B1 | * | 5/2001 | Liao et al. | 327/218 |
| 6,864,732 B2 | * | 3/2005 | Chalasani | 327/203 |
| 2001/0055344 A1 | | 12/2001 | Lee et al. | |

* cited by examiner

*Primary Examiner*—Kenneth B. Wells
(74) *Attorney, Agent, or Firm*—Myers Bigel Sibley & Sajovec, P.A.

(57) ABSTRACT

Circuits, methods and systems are provided to reduce skew between a first digital signal that is transmitted by a first driver circuit over a first signal line, and a second digital signal that is transmitted by a second driver circuit over a second signal line. Skew may be reduced by sourcing or sinking additional current to or from the first signal line in response to the first digital signal and the second digital signal transitioning to opposite logical values, and otherwise refraining from sourcing or sinking the additional current to or from the first signal line. Skew may also be reduced between the first digital signal that is transmitted by the first driver circuit over the first signal line and a third digital signal that is transmitted by a third driver circuit over a third signal line by sourcing or sinking additional current to or from the first signal line in response to the first digital signal and the third digital signal transitioning to opposite logical values, and to otherwise refrain from sourcing or sinking the additional current to or from the first signal line.

39 Claims, 6 Drawing Sheets

Case1: Only one transition (IN1: L→H, IN2: H→H)

Case 2: Same transition (IN1: L→H, IN2: L→H)

Case3: Opposite transition (IN1: L→H, IN2: H→L)

| IN1 | IN2 | P1 | P2 | N1 | N2 | Out1 | Effects to D1 During Transition |
|---|---|---|---|---|---|---|---|
| L→Z | L→Z | C→O | O→C | C→O | O→C | Z→Z | N |
|  | Z→L | C→O | C→O | O→C | O→C | G→P | D |
|  | L→L | C→O | O→C | C→C | O→C | Z→P | D |
|  | Z→Z | C→O | C→C | O→O | O→C | G→Z | N |
| Z→L | L→Z | O→C | O→C | C→O | C→O | P→G | D |
|  | Z→L | O→C | C→O | O→C | C→O | Z→Z | N |
|  | L→L | O→C | O→C | O→O | C→O | O→Z | N |
|  | Z→Z | O→C | C→C | C→C | C→O | Z→G | D |

SKEW-REDUCING SIGNAL LINE SUB-DRIVER CIRCUITS, METHODS AND SYSTEMS

FIELD OF THE INVENTION

This invention relates to digital signal line drivers, methods and systems, and more particularly to skew-reducing digital signal line driver circuits, methods and systems.

BACKGROUND OF THE INVENTION

Digital signal lines are used to transmit digital signals between a transmitter and a receiver. The signal lines may be "on-chip" signal lines that connect various subsystems on a single integrated circuit chip. For example, on-chip signal lines may connect a memory subsystem with a processor or host subsystem on a single integrated circuit chip. The on-chip digital signals may be, for example, data signals from a memory subsystem, often referred to as "DQ" signals. Alternatively, the signal lines may be "off-chip" signal lines, wherein output drivers drive a digital signal off an integrated circuit chip over a signal line that connects a given chip with another chip, another level of packaging or with an external system.

As the clock speeds of digital signals continue to increase, for example approaching 1 GHz or more, skew between/among adjacent signal lines may become increasingly problematic. In particular, as is well known to those having skill in the art, skew may be introduced among adjacent signal lines, so that signals that are transmitted synchronously over the signal lines may arrive at different times. Skew may be defined as the time difference or delay difference of a signal that passes through two transmission paths having different time delays.

As is well known to those having skill in the art, there are many potential causes of skew. For example, the different signal lines may have different physical lengths. This line length difference may cause skew. Moreover, the different signal lines may have different capacitances (actual and/or parasitic), which may also cause skew. The signals being transmitted over different signal lines may also pass through different numbers of gates, which may also cause skew. Skew also may be caused when output drivers have different output impedance and/or when different types of gates are used. There may also be other causes of skew. As the transmission speeds of digital signals continue to increase, skew may become more problematic. In particular, skew may limit the ultimate speed of the circuit and/or may reduce the operating margins thereof. Accordingly, techniques have been developed to reduce skew.

For example, it is known to add additional delay on the short delay path, to thereby equalize delay with a longer delay path. Unfortunately, this may increase the complexity of the transmitting or receiving circuit, and may also be difficult to implement when the time delay difference is variable. Various Delay Lock Loop (DLL) and/or Phase Lock Loop (PLL) techniques have also been used to lock in one signal to another. Unfortunately, these techniques may also add to the circuit complexity and a DLL/PLL may introduce its own delay due to locking time of the DLL/PLL.

Another technique for compensating for skew is described in U.S. Patent Application Publication US 2001/0055344 A1 entitled "*Signal Transmission Circuit And Method For Equalizing Disparate Delay Times Dynamically, And Data Latch Circuit Of Semiconductor Device Implementing The Same*", assigned to the assignee of the present invention, the disclosure of which is hereby incorporated by reference in its entirety as if set forth fully herein. As disclosed in the Abstract of this U.S. patent application publication, a signal transmission circuit and a method equalize differential delay characteristics of two signal transmission lines. A controllable delay unit is connected serially to the second line, so as to compensate by adding its internal delay. An auxiliary signal transmission line replicates the second transmission line, while it processes the input signal of the first. A controlling unit compares the output signal of the first transmission line and the auxiliary signal transmission line, and adjusts dynamically the internal delay of the controllable delay unit, to attain continuous synchronization. A data latch circuit synchronizes the delays of data paths by having one controllable delay units in each of the data paths.

SUMMARY OF THE INVENTION

Some embodiments of the present invention provide circuits for reducing skew between a first digital signal that is transmitted by a first driver circuit over a first signal line and a second digital signal that is transmitted by a second driver circuit over a second signal line. These skew-reducing circuits may comprise a sub-driver circuit that is responsive to the first digital signal and the second digital signal transitioning to opposite logical values, to source or sink current to or from the first signal line, and to otherwise refrain from sourcing or sinking current to or from the first signal line. In some embodiments, the sub-driver circuit may be responsive to the first digital signal transitioning from a high logic value to a low logic value and the second digital signal simultaneously transitioning from the low logic value to the high logic value, to sink current from the first signal line. In other embodiments, the sub-driver circuit may be responsive to the first digital signal transitioning from the low logic value to the high logic value and the second digital signal simultaneously transitioning from the high logic value to the low logic value, to source current to the first signal line. The sub-driver circuit may be configured to otherwise refrain from sourcing or sinking current to or from the first signal line by otherwise maintaining a high impedance state.

In some embodiments, the first driver circuit comprises a first inverter including a first inverter input that is responsive to the first digital signal and a first inverter output, and a second inverter including a second inverter input that is responsive to the first inverter output and a second inverter output that is configured to drive the first signal line. The second driver circuit may comprise a third inverter including a third inverter input that is responsive to the second digital signal and a third inverter output, and a fourth inverter including a fourth inverter input that is responsive to the third inverter output and a fourth inverter output that is configured to drive the second signal line. In these embodiments, the sub-driver circuit may include a first sub-driver input that is responsive to the first inverter output, a second sub-driver input that is responsive to the second digital signal and a sub-driver output that is configured to drive the first signal line.

In still other embodiments, the sub-driver circuit may include first and second transistors of a first conductivity type (such as PMOS transistors) including controlled electrodes (for example, source/drain electrodes) that are serially connected between a first supply voltage (such as a power supply voltage) and the sub-driver output and further including controlling electrodes (such as gates). The sub-driver circuit may also include third and fourth transistors of a second conductivity type (such as NMOS transistors) including controlled electrodes that are serially connected between the sub-driver output and a second supply voltage (such as ground voltage) and further including controlling electrodes. The controlling electrodes of the first and fourth transistors are connected to the first inverter output, and the controlling electrodes of the second and third transistors are connected to the second digital signal. The first and second signal lines may be adjacent one another, on-chip and/or off-chip.

Still other embodiments of the present invention may include a circuit for further reducing skew between the first digital signal that is transmitted by the first driver circuit over the first signal line, and a third digital signal that is transmitted by a third driver circuit over a third signal line. According to these embodiments, a second sub-driver circuit is provided that is responsive to the first digital signal and the third digital signal transitioning to opposite logical values, to source or sink current to or from the first signal line, and to otherwise refrain from sourcing or sinking current to or from the first signal line. In some embodiments, the second sub-driver circuit may be responsive to the first digital signal transitioning from a high logic value to a low logic value and the third digital signal simultaneously transitioning from the low logic value to the high logic value, to sink current from the first signal line. In other embodiments, the second sub-driver circuit may be further responsive to the first digital signal transitioning from the low logic value to the high logic value and the third digital signal simultaneously transitioning from the high logic value to the low logic value, to source current to the first signal line. The second sub-driver circuit may be configured to otherwise refrain from sourcing or sinking current to or from the first signal line by otherwise maintaining a high impedance state.

In some embodiments, the third driver circuit comprises a fifth inverter including a fifth inverter input that is responsive to the third digital signal and a fifth inverter output, and a sixth inverter including a sixth inverter input that is responsive to the fifth inverter output and a sixth inverter output that is configured to drive the third signal line. In these embodiments, the second sub-driver circuit may include a third sub-driver input that is responsive to the first inverter output, a fourth sub-driver input that is responsive to the third digital signal and a sub-driver output that is configured to drive the first signal line.

Moreover, in some embodiments, the second sub-driver circuit may comprise fifth and sixth transistors of the first conductivity type including controlled electrodes that are serially connected between the first supply voltage and the second sub-driver output and further including controlling electrodes. The second sub-driver circuit may also include seventh and eighth transistors of the second conductivity type including controlled electrodes that are serially connected between the second sub-driver output and the second supply voltage and further including controlling electrodes. The controlling electrodes of the fifth and eighth transistors may be connected to the first inverter output, and the controlling electrodes of the sixth and seventh transistors may be connected to the third digital signal. In these embodiments, the second and third signal lines may be adjacent the first signal line, on-chip and/or off-chip.

Other embodiments of the present invention provide methods for reducing skew between a first digital signal that is transmitted over a first signal line and a second digital signal that is transmitted over a second signal line. These methods may include sourcing additional current to or sinking additional current from the first signal line, responsive to the first digital signal and the second digital signal transitioning to opposite logical values, and refraining from sourcing the additional current to or sinking the additional current from the first signal line otherwise.

In some embodiments, additional current is sunk from the first current signal line responsive to the first digital signal transitioning from a high logic value to a low logic value and the second digital signal simultaneously transitioning from the low logic value to the high logic value. In other embodiments, additional current is sourced into the first signal line responsive to the first digital signal transitioning from the low logic value to the high logic value and the second digital signal simultaneously transitioning from the high logic value to the low logic value. In still other embodiments, additional current is not sourced to and additional current is not sunk from the signal line when only one of the first or second digital signals transitions between the high and low logic values.

Additional method embodiments can further reduce skew between the first digital signal and a third digital signal that is transmitted over a third signal line by sourcing additional current to or sinking additional current from the first signal line responsive to the first digital signal and the third digital signal transitioning to opposite logical values, and refraining from sourcing the additional current to or sinking the additional current from the first signal line otherwise. Sinking and sourcing may be performed as was described above.

Still other embodiments of the present invention can incorporate circuits and methods for reducing skew according to any of the above-described embodiments into a data transmission system. The data transmission system may include first and second signal lines, a first driver circuit that is configured to transmit a first digital signal over the first signal line and a second driver circuit that is configured to transmit a second digital signal over the second signal line. Sub-driver circuits and/or methods according to any of the above-described embodiments may also be included in the data transmission system. Moreover, a third signal line, a third driver circuit and a second sub-driver circuit/method also may be included according to any of the above-described embodiments. The first, second and/or third signal lines may be on-chip and/or off-chip signal lines that are adjacent one another. Moreover, in some embodiments, an integrated circuit may include a memory sub-system and a processor sub-system, and the first and seconds signal lines are on-chip data lines, often referred to as "DQ" lines, between the memory sub-system and the processor sub-system.

DETAILED DESCRIPTION

Figure 1:
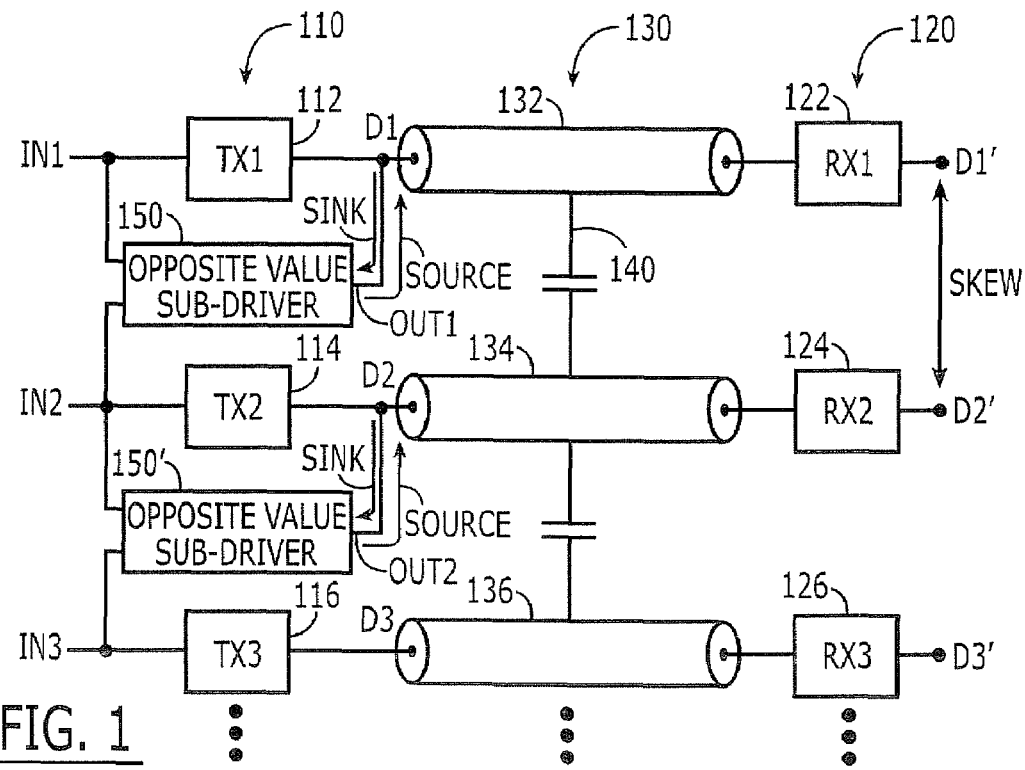
FIGS. 1 and 2 are block diagrams of systems, methods and circuits for reducing skew between a first digital signal that is transmitted by a first driver circuit over a first signal line, and a second digital signal that is transmitted by a second driver circuit over a second signal line, according to embodiments of the present invention.

The present invention is described more fully hereinafter with reference to the accompanying drawings, in which example embodiments of the invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity. Moreover, each embodiment described and illustrated herein includes its complementary conductivity type embodiment as well.

It will be understood that when an element or layer is referred to as being "connected to," "coupled to" or "responsive to" (or variants thereof) another element, it can be directly connected, coupled or responsive to the other element or intervening elements may be present. In contrast, when an element is referred to as being "directly connected to," "directly coupled to" or "directly responsive to" (or variants thereof) another element, there are no intervening elements present. Like numbers refer to like elements throughout. As used herein, the term "and/or" includes any and all combinations of one or more of the associated listed items and may be abbreviated as "/".

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising" (or variants thereof), when used in this specification, specify the presence of stated features, integers, steps, operations, elements, and/or components, but do not preclude the presence or addition of one or more other features, integers, steps, operations, elements, components, and/or groups thereof.

It should also be noted that in some alternate implementations, the functionality of a given block may be separated into multiple blocks and/or the functionality of two or more blocks may be at least partially integrated.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present application, and will not be interpreted in an idealized or overly formal sense unless expressly so defined herein.

Some embodiments of the present invention can at least partially compensate for skew between or among adjacent signal lines, wherein the skew is caused by parasitic capacitances between/among the adjacent signal lines. Some embodiments of the present invention can at least partially compensate for variable delay that is introduced when the capacitance between/among the adjacent signal lines varies due to manufacturing tolerances and/or other factors. Moreover, some embodiments of the present invention can provide sub-driver circuits and/or methods that can be relatively simple to implement. Finally, some embodiments of the present invention can provide real-time operation and need not introduce a lag that is caused by phase lock loop or delay lock loop locking times. Other types/causes of skew also may be at least partially compensated for.

FIG. 1 is a block diagram of data transmission systems and methods including circuits and methods for reducing skew according to some embodiments of the present invention. As shown in FIG. 1, these data transmission systems/methods include a transmitting system 110, a receiving system 120 and a plurality of signal lines 130 that are configured to transmit digital signals between the transmitting system 110 and the receiving system 120. The signal lines 130 may be on-chip signal lines that are configured to connect given sub-systems within an integrated circuit device. For example, the signal lines 130 may include on-chip wiring that is configured to connect a memory sub-system and a processor sub-system on-chip. In other embodiments, the signal lines 130 are off-chip signal lines that are configured to connect two different devices on two different integrated circuits or on an integrated circuit and another level of packaging/external system. The signal lines 130 also may combine on-chip and off-chip signal lines. The signal lines 130 may constitute signal wires/cables and may include separate ground planes and/or other shielding, as is well known to those having skill in the art.

Still referring to FIG. 1, a first driver circuit 112, also referred to as TX1, is configured to transmit a first digital signal IN1 over a first signal line 132. A second driver circuit 114, also referred to as TX2, is configured to transmit a second digital signal IN2 over a second signal line 134. A first receiver circuit 122, also referred to as RX1, is configured to receive the first digital signal from the first signal line 132, and a second receiver 124, also referred to as RX2, is configured to receive the second digital signal from the second signal line 134. The signals that are actually transmitted by the first and second driver circuits 112, 114, respectively, are referred to as D1 and D2 in FIG. 1. Finally, the signals that are received by the receiver circuits 122, 124, are referred to as D1', D2'. Moreover, third, fourth, etc. driver circuits, signal lines and receiver circuits also may be provided as shown in FIG. 1. As is known to those having skill in the art, the signals D1', D2' will be delayed relative to their counterparts D1, D2. Moreover, the delay may often be unequal due to the parasitic capacitance 140 and/or other factors that may differentiate between the adjacent signal lines 132, 134. This different skew may impact the ultimate speed of the circuit and/or the operating margins thereof, and may be exacerbated as the operating speed of the circuits continues to increase. The design and operation of data transmission systems/methods as described in this paragraph, including the transmission system 110, the receiving system 120, and the signal lines 130, are well known to those having skill in the art and need not be described further herein.

Still referring to FIG. 1, according to some embodiments of the present invention, an opposite value sub-driver 150, also referred to as a sub-driver or sub-driver circuit 150, is provided. The sub-driver circuit 150 is responsive to the first digital signal IN1 and the second digital signal IN2 transitioning to opposite logical values, to source or sink current to or from the first signal line 132, as shown by the "source" and "sink" arrows in FIG. 1, and to otherwise refrain from sourcing or sinking current to or from the first signal line 132. Skew that is produced when the first and second digital signals simultaneously transition to opposite logical values may thereby be reduced or eliminated.

In some embodiments of the invention, the opposite value sub-driver circuit 150 is further configured to be responsive to the first digital signal IN1 transitioning from a high logic value to a low logic value, and the second digital signal IN2 simultaneously transitioning from the low logic value to the high logic value, to sink current from the first signal line 132. In other embodiments, the opposite value sub-driver circuit 150 is further configured to be responsive to the first digital signal IN1 transitioning from the low logic value to the high logic value, and the second digital signal IN2 simultaneously transitioning from the high logic value to the low logic value, to source current to the first signal line 132. The output of the opposite value sub-driver 150 is denoted OUT1. Finally, it will also be understood that an opposite value sub-driver may be provided between adjacent pairs of driver circuits, as shown, for example, by a second opposite value sub-driver 150' that is between driver circuits 114 and 116.

Figure 2:
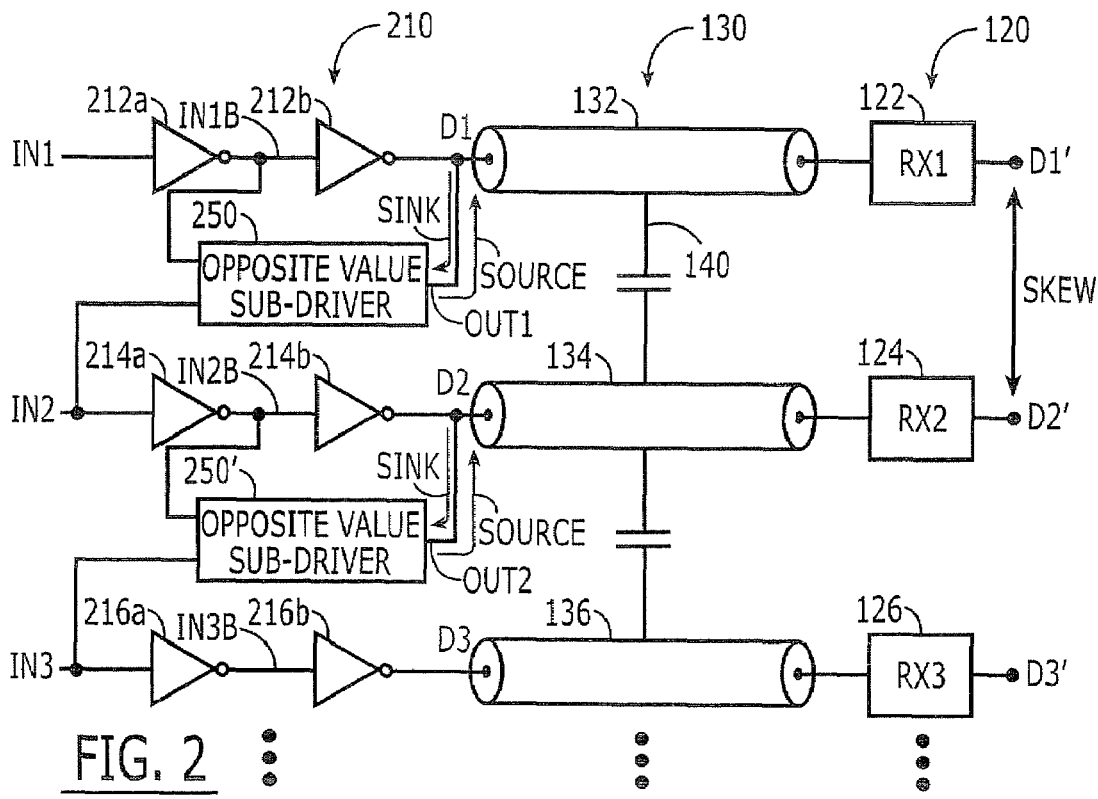

FIG. 2 is a more detailed block diagram of some embodiments of the present invention, wherein details of the transmission system 210, which may correspond to the transmission system 110 of FIG. 1, are provided. In FIG. 2, the driver circuits 112, 114, 116 of FIG. 1 are replaced by NAND-type driver circuits that include pairs of inverters. In particular, as shown in FIG. 2, the first driver circuit comprises a first inverter 212a including a first inverter input that is responsive to the first digital signal IN1, and a first inverter output $\overline{IN1}$ or IN1B, and a second inverter 212b including a second inverter input that is responsive to the first inverter output IN1B, and a second inverter output that is configured to driver the signal line 132. Similarly, the second driver circuit comprises a third inverter 214a including a third inverter input that is responsive to the second digital signal IN2 and a third inverter output IN2B, and a fourth inverter 214b including a fourth inverter input that is responsive to the third inverter output IN2B and a fourth inverter output that is configured to driver the second signal line 134.

As also shown in FIG. 2, in these embodiments, the sub-driver circuit 250, 250', which may correspond to the sub-driver circuits 150, 150' of FIG. 1, includes a first sub-driver input that is responsive to the first inverter output IN1B, a second sub-driver input that is responsive to the second digital signal IN2, and a sub-driver output OUT1, that is configured to drive the first signal line 132. Overall operation of the opposite value sub-driver 250, 250' may be similar to that which was described above in connection with opposite value sub-driver 150, 150', and will not be described again. Moreover, as was described above in connection with FIG. 1, skew between other adjacent pairs of signal lines may also be compensated by providing additional opposite value sub-drivers, as shown. It will also be understood that in a NAND-type driver system, as shown in FIG. 2, the receivers 120, 124 . . . may also comprise pairs of serially connected inverters.

Figure 3:
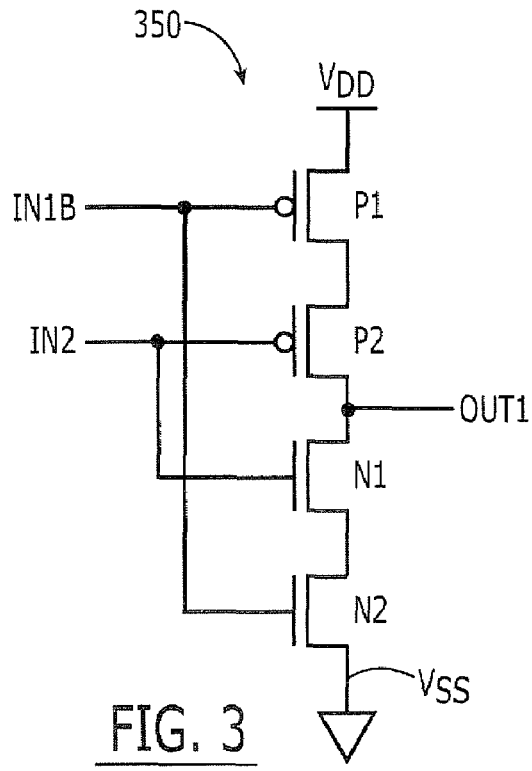
FIG. 3 is a circuit diagram of a sub-driver of FIGS. 1 and/or 2, according to various embodiments of the present invention.

FIG. 3 is a circuit diagram of an opposite value sub-driver circuit 350 according to various embodiments of the present invention, which may correspond to opposite value sub-driver 150 of FIG. 1 or 250 of FIG. 2. As shown in FIG. 3, the sub-driver circuit 350 comprises first and second field effect transistors of a first conductivity type, and third and fourth field effect transistors of a second conductivity type. The first and second transistors of a first conductivity type are embodied in FIG. 3 as PMOS transistors P1 and P2, respectively, whereas the third and fourth transistors of a second conductivity type are embodied as NMOS transistors N1 and N2. However, opposite conductivity type transistors and/or bipolar and/or other types of transistors also may be employed in other embodiments of the present invention.

Still referring to FIG. 3, the first and second transistors P1 and P2 include controlled electrodes (source/drains for field effect transistors) that are serially connected between a first supply voltage, which may be a power supply voltage $V_{DD}$, and the sub-driver output OUT1. The third and fourth transistors of a second conductivity type N1 and N2, respectively, include controlled electrodes (source/drains for field effect transistors) that are serially connected between the sub-driver output OUT1 and a second supply voltage, such as ground voltage $V_{SS}$. Moreover, as also shown in FIG. 3, the controlling electrodes (gates for field effect transistors) of the first P1 and fourth N2 transistors are connected to the first inverter output IN1B, and the controlling electrodes of the second P2 and third N1 transistors are connected to the second digital signal IN2. Similar circuit configurations may be provided for other sub-driver circuits, such as sub-driver circuits 150'/250'.

Figure 4:
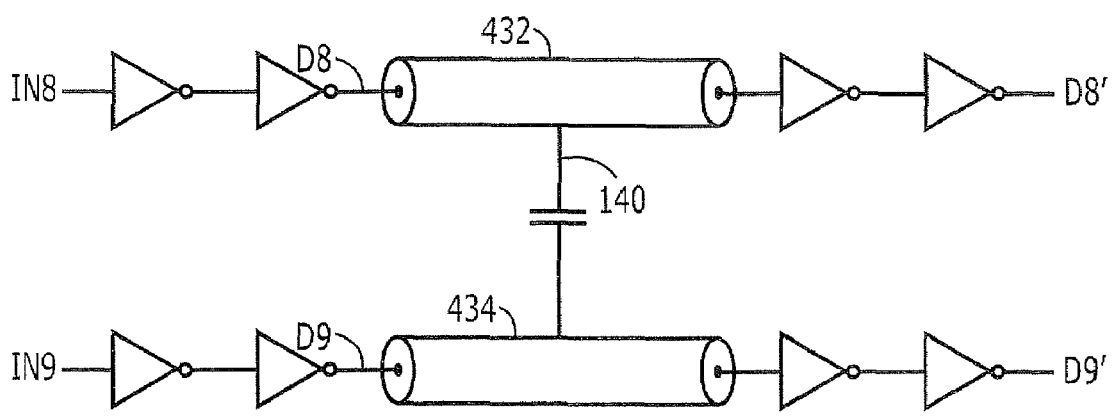
FIG. 4 is a block diagram of conventional transmission of a first digital signal by a first driver circuit over a first signal line and of a second digital signal by a second driver circuit over a second signal line, wherein parasitic capacitances between the signal lines may give rise to skew.

Operations of sub-driver circuits 350 of FIG. 3 will now be described in connection with the timing diagram of FIG. 5. In order to allow a comparison, FIG. 4 illustrates a conventional data transmission system in which first and second signal lines 432, 434, respectively, are driven by first and second driver circuits that are configured to transmit a first digital signal IN8 and a second digital signal IN9 over the first and second transmission lines 432, 434, respectively. The signals that are transmitted are denoted D8, D9, and the signals that are received, with delay and skew, are denoted D8', D9'. Identical parasitic capacitance 140 is assumed between the signal lines 432 and 434 of FIG. 4, and the signal lines 132 and 134 of FIGS. 1 and 2.

Figure 5:
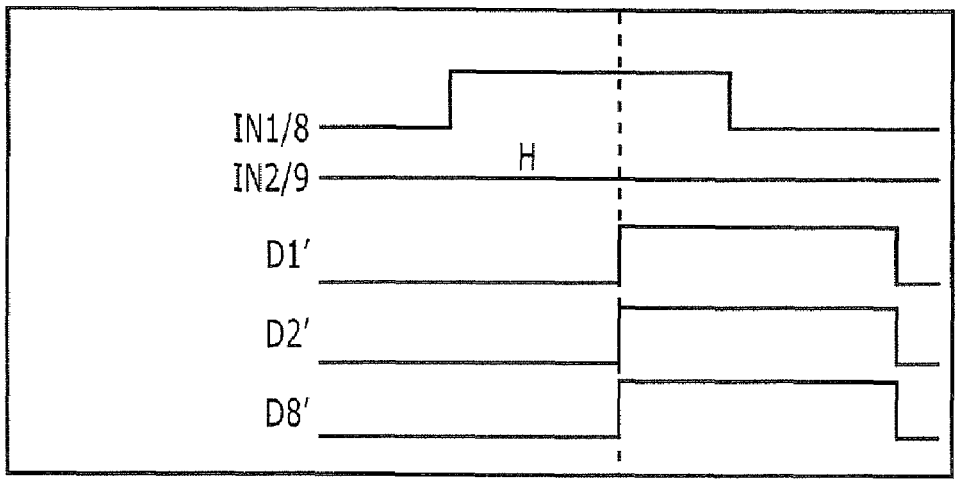
FIG. 5 is a timing diagram illustrating operations of embodiments of FIGS. 1-3 compared to conventional drivers of FIG. 4.
Figure 5:
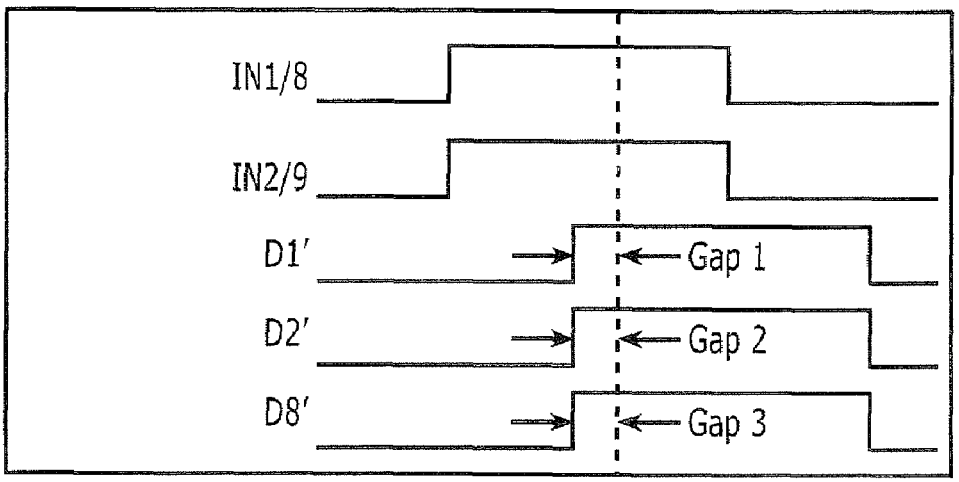
Figure 5:
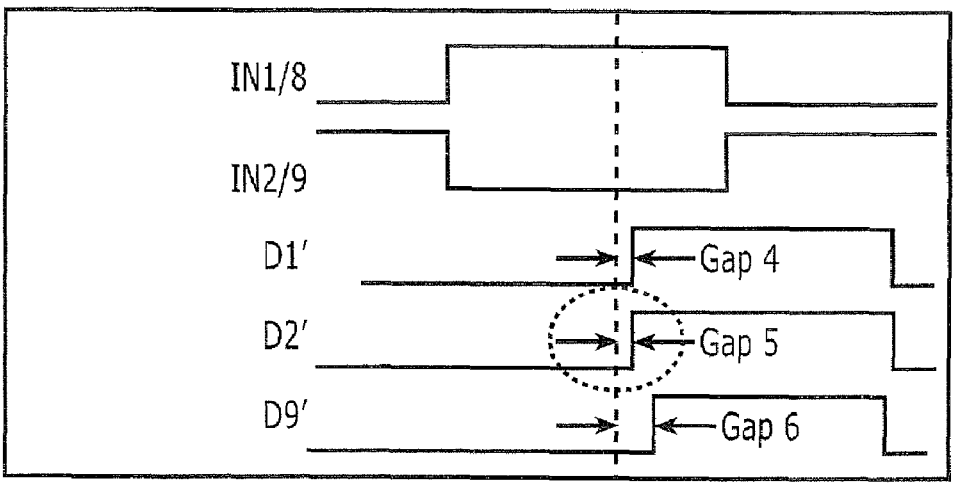

FIG. 5 is a timing diagram illustrating operations of sub-driver circuits 350 according to various embodiments of the present invention, compared to circuits that do not include sub-driver circuits as was illustrated in FIG. 4. Three cases are illustrated in FIG. 5: Case1, wherein only one of the digital signals transitions in logical value; Case2, wherein both of the digital signals simultaneously transition to the same logical value; and Case3, wherein the first and second digital signals simultaneously transition to opposite the logical values. In all three cases, operations according to embodiments of the present invention (as illustrated in FIGS. 1-3) are compared with a conventional data transmission system (FIG. 4).

Referring now to FIG. 5, in Case1, only the first digital signal (IN1 for embodiments of the present invention and IN8 for the conventional system) changes in logical value, whereas the second digital signal (IN2 for embodiments of the invention and IN9 for a conventional system) remains at a high logical value. As shown in FIG. 5, D1' and D2', the received first and second digital signals, are received in synchronism and at the same time as a conventional signal D8 would be received. Accordingly, when only one logical value transition takes place, skew-reducing circuits and methods according to some embodiments of the present invention may not have an effect.

Case2 illustrates both the first and second input signals simultaneously undergoing a same transition in logical value (shown as from logic low to logic high in Case2). As shown in Case2, D1' and D2' are delayed by the same amount that D8' is delayed, so that the amount of delay indicated by "Gap 1", "Gap 2" and "Gap 3" is the same. Again, as was the case in Case1, sub-driver circuits and methods according to some embodiments of the invention do not effect the delay time.

In contrast, in Case3, the first and second digital signals undergo opposite simultaneous transitions, with IN1 transitioning from logic low to logic high and IN2 transitioning from logic high to logic low. As shown for Case3, D1' and D2' have reduced skew, as shown by "Gap 4" and "Gap 5", compared to skew created on D9', as indicated by "Gap 6". Accordingly, sub-driver circuits and methods according to embodiments of the present invention can reduce skew for simultaneous opposite value transitions compared to systems that do not employ sub-driver circuits according to embodiments of the present invention.

Figures 6A, 6B:
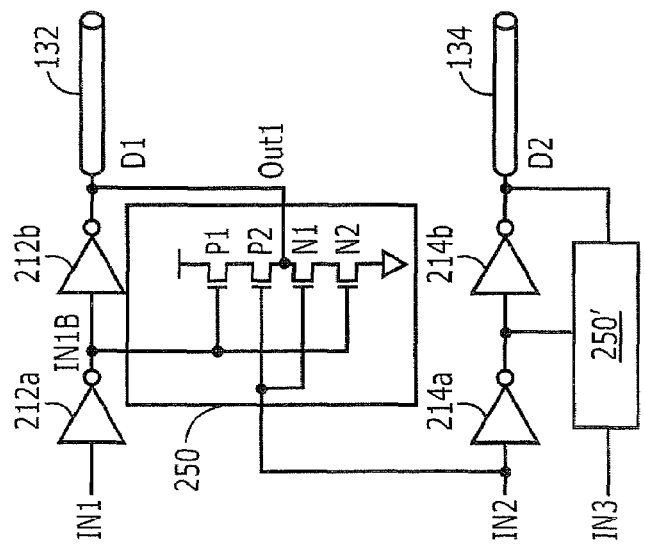
FIG. 6A is a circuit diagram of a sub-driver circuit of FIG. 3 combined with first and second driver circuits of FIG. 2, according to various embodiments of the present invention.
FIG. 6B is a table illustrating operation of transistors of FIG. 6A responsive to various changes in the input signals that are applied thereto, and the net effect on the output of an opposite phase sub-driver of FIG. 6A, according to various embodiments of the present invention.

FIG. 6A is a circuit diagram that combines first and second driver circuits of FIG. 2 with an opposite value sub-driver circuit of FIG. 3. FIG. 6B is a table that illustrates the various transitions between the first and second input signals IN1 and IN2, the transitions that are made among the transistors P1, P2, N1 and N2, the transitions of the output OUT1 of the sub-driver circuit 250, and the effects on D1 during the transition. In FIG. 6B, C denotes that a transistor is closed (ON), whereas O denotes the transistor is open (OFF). L denotes the logic low value and H denotes the logic high value. Z denotes a high impedance state. P denotes that current is supplied (sourced) from the power supply into the first signal line 132. G denotes current is sunk from the first signal line 132 into ground. N indicates that no effect is provided by the sub-driver circuit 250 to the first signal line 132. Finally, D indicates that current is sourced to the first signal line 132 or sunk from the first signal line 132 by the first sub-driver 150, to compensate for the delay caused by the parasitic capacitance, by adding driving power to the first driver circuit 112.

As shown in the top half of the last column of FIG. 6, when the first input signal IN1 transitions from logic low to the high impedance state, and the second input signal IN2 transitions from the high impedance state to logic low or remains at logic low, current is sourced to the first signal line 132. Otherwise, the opposite value sub-driver circuit has no effect. Moreover, as shown at the bottom half of the last column of FIG. 6B, when the first digital signal IN1 transitions from the high impedance state to logic low and the second digital signal IN2 transitions from logic low to the high impedance state, or remains in the high impedance state, current is sunk from the first signal line 132, but otherwise, the opposite value sub-driver has no effect.

Accordingly, when the first input IN1 transitions from logic low to high impedance and the second input IN2 simultaneously transitions from high impedance to logic low, corresponding to the second row of FIG. 6B, or the second input IN2 remains at logic low, corresponding to the third row of FIG. 6B, the sub-driver circuit 150/250/350 sources current onto the signal line 132, to charge the parasitic capacitance 140. Conversely, when the first input IN1 transitions from high impedance to logic low and the second input IN2 transitions from logic low to high impedance or remains in the high impedance state, the opposite value sub-driver circuit 150/250/350 sinks current from the signal line 132, to thereby discharge the parasitic capacitance 140.

FIGS. 1-3 and 5-6B also illustrate methods for reducing skew between a first digital signal IN1 that is transmitted over a first signal line 132, and a second digital signal IN2 that is transmitted over a second signal line 134 according to some embodiments of the invention. These methods include sourcing additional current to or sinking additional current from first signal line 132 responsive to the first digital signal IN1 and the second digital signal IN2 transitioning to opposite logic values. These methods also comprise refraining from sourcing the additional current to or sinking the additional current from the first signal line 132 otherwise.

Figure 7:
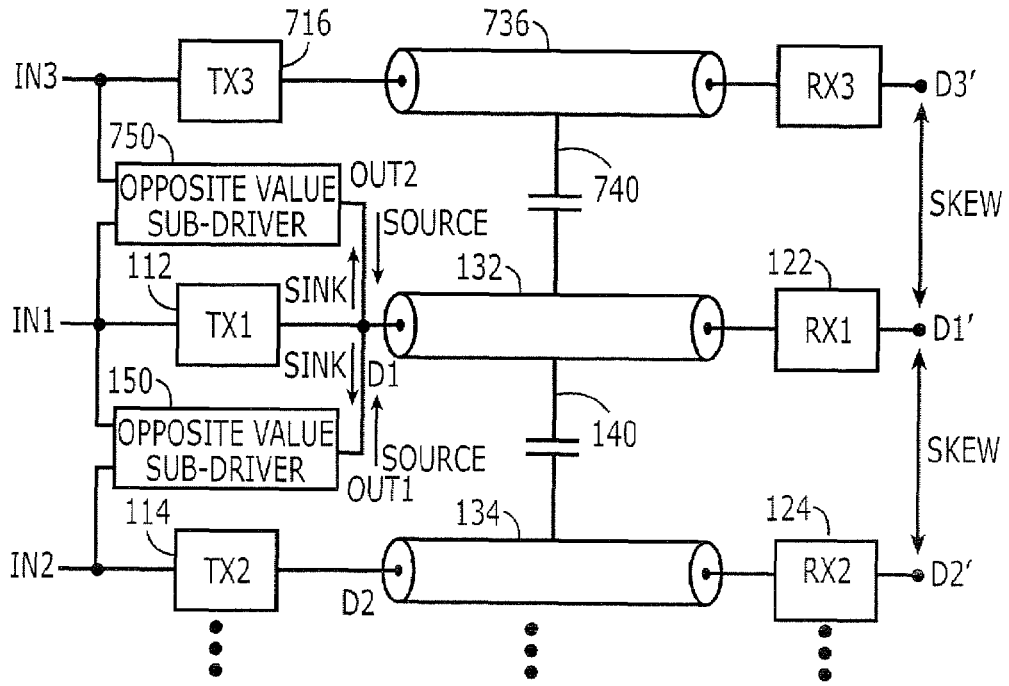
FIGS. 7 and 8 are block diagrams of systems, methods and circuits for reducing skew between a first digital signal that is transmitted by a first driver circuit over a first signal line, a second digital signal that is transmitted by a second driver circuit over a second signal line and a third digital signal that is transmitted by a third driver circuit over a third signal line, according to various embodiments of the present invention.
Figure 8:
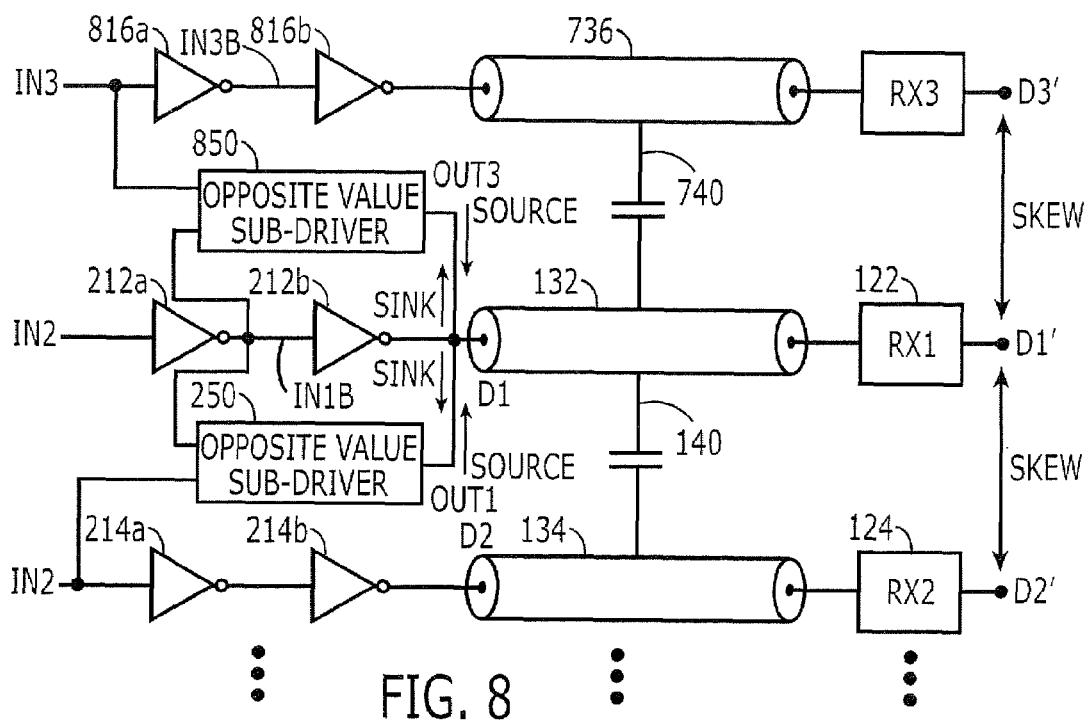
Figure 9:
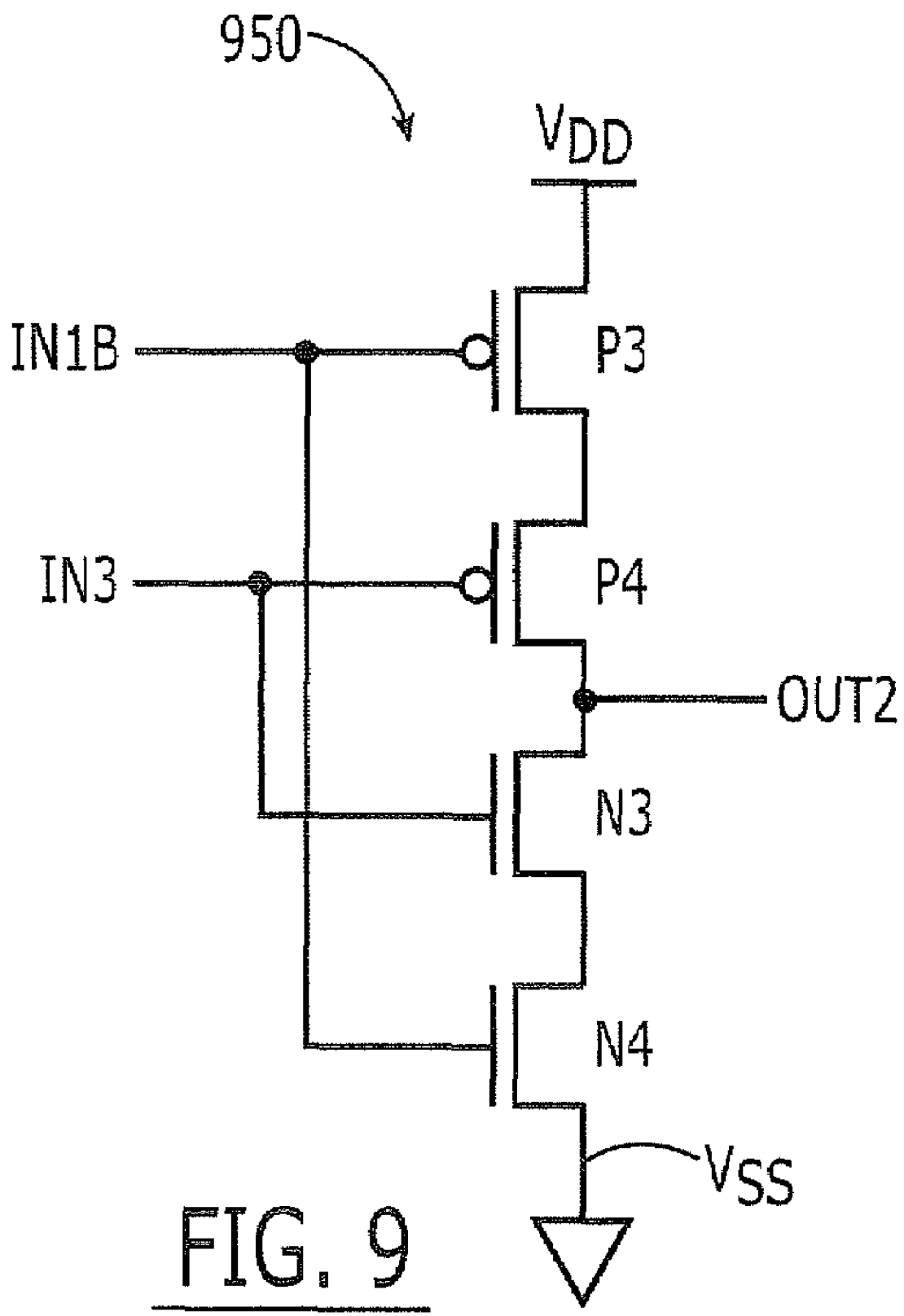
FIG. 9 is a circuit diagram of a sub-driver of FIGS. 7 and/or 8, according to various embodiments of the present invention.

Embodiments of the present invention that have been described above in connection with FIGS. 1-3 and 5-6B provide opposite value sub-driver circuits between a first signal line and a second signal line that is, in some embodiments, adjacent thereto. Other embodiments of the invention that will now be described in connection with FIGS. 7-9 can potentially decrease the amount of skew further by providing an opposite value sub-driver between a given signal line and the two adjacent data lines (one on either side). Thus, skew that is caused by parasitic capacitance between a given signal line and two adjacent signal lines (one on either side) may be at least partially compensated. Accordingly, FIGS. 7-9 illustrate circuits, systems and methods that may be used to reduce skew caused by parasitic capacitances between a given signal line and two adjacent data lines. The sub-driver circuits may operate independently of one another, to source or sink current in response to the digital signals to which they are connected transitioning to opposite logical values.

More specifically, FIG. 7 is similar to FIG. 1, in that a first opposite value sub-driver circuit 150 is used to reduce skew between a first digital signal IN1 that is transmitted by a first driver circuit 112 over a first signal line 132, and a second digital signal IN2 that is transmitted by a second driver circuit 114 over a second signal line 134. The first sub-driver circuit 150 may operate as was already described in connections with FIGS. 1-3 and 5-6B. However, embodiments of FIG. 7 may also reduce skew between the first digital signal IN1 that is transmitted by the first driver circuit 112 over the first signal line 132, and a third digital signal IN3 that is transmitted by a third driver circuit 716 over a third signal line 736. As shown in FIG. 7, a second opposite value sub-driver circuit 750 is responsive to the first digital signal IN1 and the third digital signal IN3 transitioning to opposite logical values, to source or sink current to or from the first signal line 132, and to otherwise refrain from sourcing or sinking current to or from the first signal line 132. Accordingly, skew that is caused by parasitic capacitance 740 between the third signal line 736 and the first signal line 132 also may be at least partially compensated.

In some embodiments, the second sub-driver circuit 750 may be configured to be responsive to the first digital signal IN1 transitioning from a high logic value to a low logic value, and the third digital signal IN3 simultaneously transitioning from the low logic value to the high logic value, to sink current from the first signal line 132. Moreover, second sub-driver circuit 750 may be further configured to be responsive to the first digital signal IN1 transitioning from the low logic value to the high logic value, and the third digital signal IN3 simultaneously transitioning from the high logic value to the low logic value, to source current to the first signal line 132, via the output OUT2 of the second opposite value sub-driver circuit 750.

FIG. 8 corresponds to FIG. 2, but adds the second opposite value sub-driver circuit in a NAND driver configuration. In particular, as was already illustrated in FIG. 2, the first driver circuit comprises a first inverter 212a and a second inverter 212b, and the second driver circuit comprises a third inverter 214a and a fourth inverter 214b. Moreover, the first sub-driver circuit 250 includes a first sub-driver input that is responsive to the first inverter output IN1B, a second sub-driver input that is responsive to the second digital signal IN2 and a sub-driver output OUT1 that is configured to drive the first signal line 132. As also shown in FIG. 8, the third driver circuit includes a fifth inverter 816a including a fifth inverter input that is responsive to the third digital signal IN3, and a fifth inverter output IN3B. The third driver circuit also includes a sixth inverter 816b including a sixth inverter input that is responsive to the fifth inverter output IN3B and a sixth inverter output that is configured to driver the third signal line 736. The second sub-driver circuit 850 includes a third sub-driver input that is responsive to the first inverter output IN1B, a fourth sub-driver input that is responsive to the third digital signal IN3 and a sub-driver output OUT3 that is configured to drive the first signal line 132. Thus, the signal D1 that drives the first signal line 132 is formed by the contributions of the second inverter 212b, the first opposite value sub-driver 250 and the second opposite value sub-driver 850.

FIG. 9 is a circuit diagram of a second opposite value sub-driver circuit 950 according to some embodiments of the present invention, which may correspond to Block 750 of FIG. 7, and/or Block 850 of FIG. 8. As shown in FIG. 9, the second sub-driver circuit 950 comprises fifth and sixth transistors of the first conductivity type P3 and P4, respectively, including controlled electrodes that are serially connected between the first supply voltage $V_{DD}$ and the second sub-driver output OUT2, and seventh and eighth transistors of the second conductivity type N3 and N4, respectively, including controlled electrodes that are serially connected between the second sub-driver output OUT2 and the second supply voltage $V_{SS}$ or ground. The controlling electrodes of the fifth and eighth transistors P3 and N4 are connected to the first inverter output IN1B and the controlling electrodes of the sixth and seventh transistors P4 and N3 are connected to the third digital input signal IN3. Operations of the second opposite value sub-driver circuit 750, 850 and/or 950 can correspond to the operations that were described above in connection with FIGS. 5, 6A and 6B and will not be described again. The second opposite value sub-driver circuit may operate independently of the first opposite value sub-driver circuit, to source or sink current into the first signal line, depending upon the transitions in logical values that occur simultaneously. Analogous methods of operation also may be provided.

Accordingly, some embodiments of the present invention can reduce skew between/among adjacent signal lines by sourcing additional current to charge a parasitic capacitance faster or by sinking additional current to discharge a parasitic capacitance faster, when the adjacent signal lines simultaneously undergo transitions in opposite directions and the skew due to parasitic capacitance may be greatest. In situations where less skew is created, for example when only one signal line makes a transition or the signal lines both transition in the same direction, the circuit can be maintained in its high impedance state, so that it does not impact the signal transmission. Accordingly, when skew is potentially the greatest, sub-driver circuits and methods according to embodiments of the present invention may operate to reduce the skew. Skew caused by one or two adjacent data lines may be compensated for, according to various embodiments of the present invention, using the adjacent data as a reference. Skew compensation may use relatively simple structures that can reduce skew regardless of the actual parasitic capacitance that is present. The structures need not be tuned to the actual operating parameters of the data transmission or the signal lines. Real-time operations also may be provided because PLL/DLL circuits need not be employed.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A circuit for reducing skew between a first digital signal that is transmitted by a first driver circuit over a first signal line and a second digital signal that is transmitted by a second driver circuit over a second signal line, the circuit for reducing skew comprising:

a sub-driver circuit that is responsive to the first digital signal and the second digital signal transitioning to opposite logical values, to source or sink current to or from the first signal line, and to refrain from sourcing or sinking current to or from the first signal line when both of the first and second digital signals transition to a same logic value.

2. A circuit according to claim 1 wherein the sub-driver circuit is further configured to be responsive to the first digital signal transitioning from a high logic value to a low logic value and the second digital signal simultaneously transitioning from the low logic value to the high logic value, to sink current from the first signal line.

3. A circuit according to claim 2 wherein the sub-driver circuit is further configured to be responsive to the first digital signal transitioning from the low logic value to the high logic value and the second digital signal simultaneously transitioning from the high logic value to the low logic value, to source current to the first signal line.

4. A circuit according to claim 1:

wherein the first driver circuit comprises a first inverter including a first inverter input that is responsive to the first digital signal and a first inverter output, and a second inverter including a second inverter input that is responsive to the first inverter output and a second inverter output that is configured to drive the first signal line;

wherein the second driver circuit comprises a third inverter including a third inverter input that is responsive to the second digital signal and a third inverter output, and a fourth inverter including a fourth inverter input that is responsive to the third inverter output and a fourth inverter output that is configured to drive the second signal line; and wherein the sub-driver circuit includes a first sub-driver input that is responsive to the first inverter output, a second sub-driver input that is responsive to the second digital signal and a sub-driver output that is configured to drive the first signal line.

5. A circuit according to claim 4 wherein the sub-driver circuit comprises:

first and second transistors of a first conductivity type including controlled electrodes that are serially connected between a first supply voltage and the sub-driver output and further including controlling electrodes;

third and fourth transistors of a second conductivity type including controlled electrodes that are serially connected between the sub-driver output and a second supply voltage and further including controlling electrodes;

the controlling electrodes of the first and fourth transistors being connected to the first inverter output; and the controlling electrodes of the second and third transistors being connected to the second digital signal.

6. A circuit according to claim 5 wherein the first and second transistors are PMOS transistors, the third and fourth transistors are NMOS transistors, the first supply voltage is a power supply voltage and the second supply voltage is ground voltage.

7. A circuit according to claim 1 wherein the sub-driver circuit is configured to otherwise refrain from sourcing or sinking current to or from the first signal line by maintaining a high impedance state.

8. A circuit according to claim 1 wherein the first and second signal lines are adjacent one another.

9. A circuit for reducing skew between a first digital signal that is transmitted by a first driver circuit over a first signal line, a second digital signal that is transmitted by a second driver circuit over a second signal line and a third digital signal that is transmitted by a third driver circuit over a third signal line, the circuit for reducing skew comprising:

a first sub-driver circuit that is responsive to the first digital signal and the second digital signal transitioning to opposite logical values, to source or sink current to or from the first signal line, and to otherwise refrain from sourcing or sinking current to or from the first signal line; and a second sub-driver circuit that is responsive to the first digital signal and the third digital signal transitioning to opposite logical values, to source or sink current to or from the first signal line, and to otherwise refrain from sourcing or sinking current to or from the first signal line.

10. A circuit according to claim 9 wherein the second sub-driver circuit is further configured to be responsive to the first digital signal transitioning from a high logic value to a low logic value and the third digital signal simultaneously transitioning from the low logic value to the high logic value, to sink current from the first signal line.

11. A circuit according to claim 10 wherein the second sub-driver circuit is further configured to be responsive to the first digital signal transitioning from the low logic value to the high logic value and the third digital signal simultaneously transitioning from the high logic value to the low logic value, to source current to the first signal line.

12. A circuit according to claim 9:

wherein the first driver circuit comprises a first inverter including a first inverter input that is responsive to the first digital signal and a first inverter output, and a second inverter including a second inverter input that is responsive to the first inverter output and a second inverter output that is configured to drive the first signal line;

wherein the second driver circuit comprises a third inverter including a third inverter input that is responsive to the second digital signal and a third inverter output, and a fourth inverter including a fourth inverter input that is responsive to the third inverter output and a fourth inverter output that is configured to drive the second signal line;

wherein the first sub-driver circuit includes a first sub-driver input that is responsive to the first inverter output, a second sub-driver input that is responsive to the second digital signal and a sub-driver output that is configured to drive the first signal line;

wherein the third driver circuit comprises a fifth inverter including a fifth inverter input that is responsive to the third digital signal and a fifth inverter output, and a sixth inverter including a sixth inverter input that is responsive to the fifth inverter output and a sixth inverter output that is configured to drive the third signal line; and wherein the second sub-driver circuit includes a third sub-driver input that is responsive to the first inverter output, a fourth sub-driver input that is responsive to the third digital signal and a sub-driver output that is configured to drive the first signal line;

13. A circuit according to claim 12:

wherein the first sub-driver circuit comprises:

first and second transistors of a first conductivity type including controlled electrodes that are serially connected between a first supply voltage and the first sub-driver output and further including controlling electrodes;

third and fourth transistors of a second conductivity type including controlled electrodes that are serially connected between the first sub-driver output and a second supply voltage and further including controlling electrodes;

the controlling electrodes of the first and fourth transistors being connected to the first inverter output; and the controlling electrodes of the second and third transistors being connected to the second digital signal; and wherein the second sub-driver circuit comprises:

fifth and sixth transistors of the first conductivity type including controlled electrodes that are serially connected between the first supply voltage and the second sub-driver output and further including controlling electrodes;

seventh and eighth transistors of the second conductivity type including controlled electrodes that are serially connected between the second sub-driver output and the second supply voltage and further including controlling electrodes;

the controlling electrodes of the fifth and eighth transistors being connected to the first inverter output; and the controlling electrodes of the sixth and seventh transistors being connected to the third digital signal.

14. A circuit according to claim 13 wherein the first, second, fifth and sixth transistors are PMOS transistors, the third, fourth, seventh and eighth transistors are NMOS transistors, the first supply voltage is a power supply voltage and the second supply voltage is ground voltage.

15. A circuit according to claim 9 wherein the first and second sub-driver circuits are configured to otherwise refrain from sourcing or sinking current to or from the first signal line by maintaining a high impedance state.

16. A circuit according to claim 9 wherein the second and third signal lines are adjacent the first signal line.

17. A circuit for transmitting a first digital signal over a first signal line and a second digital signal over a second signal line, the circuit comprising:

a first inverter including a first inverter input that is responsive to the first digital signal and a first inverter output;

a second inverter including a second inverter input that is responsive to the first inverter output and a second inverter output that is configured to drive the first signal line;

a third inverter including a third inverter input that is responsive to the second digital signal and a third inverter output;

a fourth inverter including a fourth inverter input that is responsive to the third inverter output and a fourth inverter output that is configured to drive the second signal line;

first and second transistors of a first conductivity type including controlled electrodes that are serially connected between a first supply voltage and the first signal line and further including controlling electrodes;

third and fourth transistors of a second conductivity type including controlled electrodes that are serially connected between the first signal line and a second supply voltage and further including controlling electrodes;

the controlling electrodes of the first and fourth transistors being connected to the first inverter output; and the controlling electrodes of the second and third transistors being connected to the second digital signal.

18. A circuit according to claim 17 wherein the first and second transistors are PMOS transistors, the third and fourth transistors are NMOS transistors, the first supply voltage is a power supply voltage and the second supply voltage is ground voltage.

19. A circuit according to claim 17 wherein the first and second signal lines are adjacent one another.

20. A circuit according to claim 17 for further transmitting a third digital signal over a third signal line, the circuit further comprising:

a fifth inverter including a fifth inverter input that is responsive to the third digital signal and a fifth inverter output;

a sixth inverter including a sixth inverter input that is responsive to the fifth inverter output and a sixth inverter output that is configured to drive the third signal line;

fifth and sixth transistors of the first conductivity type including controlled electrodes that are serially connected between the first supply voltage and the first signal line and further including controlling electrodes;

seventh and eighth transistors of the second conductivity type including controlled electrodes that are serially connected between the first signal line and the second supply voltage and further including controlling electrodes;

the controlling electrodes of the fifth and eighth transistors being connected to the first inverter output; and the controlling electrodes of the sixth and seventh transistors being connected to the third digital signal.

21. A circuit according to claim 20 wherein the first, second, fifth and sixth transistors are PMOS transistors, the third, fourth, seventh and eighth transistors are NMOS transistors, the first supply voltage is a power supply voltage and the second supply voltage is ground voltage.

22. A circuit according to claim 20 wherein the second and third signal lines are adjacent the first signal line.

23. A method for reducing skew between a first digital signal that is transmitted over a first signal line and a second digital signal that is transmitted over a second signal line, the method comprising:

sourcing a current to or sinking a current from the first signal line responsive to the first digital signal and the second digital signal transitioning to opposite logical values; and refraining from sourcing the current to or sinking the current from the first signal line when both of the first and second digital signals transition to a same logic value.

24. A method according to claim 23 wherein sourcing a current to or sinking a current from the first signal line responsive to the first digital signal and the second digital signal transitioning to opposite logical values comprises:

sinking a current from the first signal line responsive to the first digital signal transitioning from a high logic value to a low logic value and the second digital signal simultaneously transitioning from the low logic value to the high logic value.

25. A method according to claim 24 wherein sourcing a current to or sinking a current from the first signal line responsive to the first digital signal and the second digital signal transitioning to opposite logical values further comprises:

sourcing a current to the first signal line responsive to first digital signal transitioning from the low logic value to the high logic value and the second digital signal simultaneously transitioning from the high logic value to the low logic value.

26. A method according to claim 23 wherein the first and second signal lines are adjacent one another.

27. A method for reducing skew between a first digital signal that is transmitted over a first signal line, a second digital signal that is transmitted over a second signal line and a third digital signal that is transmitted over a third signal line, the method comprising:

sourcing a current to or sinking a current from the first signal line responsive to the first digital signal and the second digital signal transitioning to opposite logical values;

sourcing a current to or sinking a current from the first signal line responsive to the first digital signal and the third digital signal transitioning to opposite logical values; and refraining from sourcing the current to or sinking the current from the first signal line otherwise.

28. A method according to claim 27 wherein sourcing a current to or sinking a current from the first signal line responsive to the first digital signal and the third digital signal transitioning to opposite logical values comprises:

sinking a current from the first signal line responsive to the first digital signal transitioning from the high logic value to the low logic value and the third digital signal simultaneously transitioning from the low logic value to the high logic value.

29. A method according to claim 28 wherein sourcing a current to or sinking a current from the first signal line responsive to the first digital signal and the third digital signal transitioning to opposite logical values further comprises:

sourcing a current to the first signal line responsive to first digital signal transitioning from the low logic value to the high logic value and the third digital signal simultaneously transitioning from the high logic value to the low logic value.

30. A method according to claim 27 wherein refraining from sourcing the current to or sinking the current from the first signal line otherwise comprises refraining from sourcing the current to or sinking the current from the first signal line when only one of the first or third digital signals transitions between the high and low logic values.

31. A method according to claim 27 wherein the second and third signal lines are adjacent the first signal line.

32. A data transmission system comprising:
first and second signal lines;
a first driver circuit that is configured to transmit a first digital signal over the first signal line;
a second driver circuit that is configured to transmit a second digital signal over the second signal line; and
a sub-driver circuit that is responsive to the first digital signal and the second digital signal transitioning to opposite logical values, to source or sink current to or from the first signal line, and to refrain from sourcing or sinking current to or from the first signal line when both of the first and second digital signals transition to a same logic value.

33. A system according to claim 32:
wherein the first driver circuit comprises a first inverter including a first inverter input that is responsive to the first digital signal and a first inverter output, and a second inverter including a second inverter input that is responsive to the first inverter output and a second inverter output that is configured to drive the first signal line;
wherein the second driver circuit comprises a third inverter including a third inverter input that is responsive to the second digital signal and a third inverter output, and a fourth inverter including a fourth inverter input that is responsive to the third inverter output and a fourth inverter output that is configured to drive the second signal line; and
wherein the sub-driver circuit includes a first sub-driver input that is responsive to the first inverter output, a second sub-driver input that is responsive to the second digital signal and a sub-driver output that is configured to drive the first signal line.

34. A system according to claim 33 wherein the sub-driver circuit comprises:
first and second transistors of a first conductivity type including controlled electrodes that are serially connected between a first supply voltage and the sub-driver output and further including controlling electrodes;
third and fourth transistors of a second conductivity type including controlled electrodes that are serially connected between the sub-driver output and a second supply voltage and further including controlling electrodes;
the controlling electrodes of the first and fourth transistors being connected to the first inverter output; and
the controlling electrodes of the second and third transistors being connected to the second digital signal.

35. A system according to claim 32 wherein the first and second signal lines are on-chip or off-chip signal lines that are adjacent one another.

36. A system according to claim 32 further comprising an integrated circuit including a memory subsystem and a processor subsystem and wherein the first and second signal lines are on-chip data lines between the memory subsystem and the processor subsystem.

37. A data transmission system comprising:
first, second and third signal lines;
a first driver circuit that is configured to transmit a first digital signal over the first signal line;
a second driver circuit that is configured to transmit a second digital signal over the second signal line;
a third driver circuit that is configured to transmit a third digital signal over the third signal line;
a first sub-driver circuit that is responsive to the first digital signal and the second digital signal transitioning to opposite logical values, to source or sink current to or from the first signal line, and to otherwise refrain from sourcing or sinking current to or from the first signal line; and
a second sub-driver circuit that is responsive to the first digital signal and the third digital signal transitioning to opposite logical values, to source or sink current to or from the first signal line, and to otherwise refrain from sourcing or sinking current to or from the first signal line.

38. A circuit according to claim 37:
wherein the first driver circuit comprises a first inverter including a first inverter input that is responsive to the first digital signal and a first inverter output, and a second inverter including a second inverter input that is responsive to the first inverter output and a second inverter output that is configured to drive the first signal line;
wherein the second driver circuit comprises a third inverter including a third inverter input that is responsive to the second digital signal and a third inverter output, and a fourth inverter including a fourth inverter input that is responsive to the third inverter output and a fourth inverter output that is configured to drive the second signal line;
wherein the first sub-driver circuit includes a first sub-driver input that is responsive to the first inverter output, a second sub-driver input that is responsive to the second digital signal and a sub-driver output that is configured to drive the first signal line;
wherein the third driver circuit comprises a fifth inverter including a fifth inverter input that is responsive to the third digital signal and a fifth inverter output, and a sixth inverter including a sixth inverter input that is responsive to the fifth inverter output and a sixth inverter output that is configured to drive the third signal line; and
wherein the second sub-driver circuit includes a third sub-driver input that is responsive to the first inverter output, a fourth sub-driver input that is responsive to the third digital signal and a sub-driver output that is configured to drive the first signal line.

39. A circuit according to claim 38:
wherein the first sub-driver circuit comprises:
first and second transistors of a first conductivity type including controlled electrodes that are serially connected between a first supply voltage and the first sub-driver output and further including controlling electrodes;
third and fourth transistors of a second conductivity type including controlled electrodes that are serially connected between the first sub-driver output and a second supply voltage and further including controlling electrodes;
the controlling electrodes of the first and fourth transistors being connected to the first inverter output; and
the controlling electrodes of the second and third transistors being connected to the second digital signal; and
wherein the second sub-driver circuit comprises:
fifth and sixth transistors of the first conductivity type including controlled electrodes that are serially connected between the first supply voltage and the second sub-driver output and further including controlling electrodes;
seventh and eighth transistors of the second conductivity type including controlled electrodes that are serially connected between the second sub-driver output and the second supply voltage and further including controlling electrodes;
the controlling electrodes of the fifth and eighth transistors being connected to the first inverter output; and
the controlling electrodes of the sixth and seventh transistors being connected to the third digital signal.

* * * * *